(12) United States Patent
Ichikawa

(10) Patent No.: US 8,988,719 B2
(45) Date of Patent: Mar. 24, 2015

(54) PRINTING APPARATUS AND LOG RECORDING METHOD

(71) Applicant: Kazuki Ichikawa, Gamagori (JP)

(72) Inventor: Kazuki Ichikawa, Gamagori (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/037,439

(22) Filed: Sep. 26, 2013

(65) Prior Publication Data

US 2014/0092436 A1    Apr. 3, 2014

(30) Foreign Application Priority Data

Oct. 3, 2012 (JP) .................................. 2012-220940

(51) Int. Cl.
*G06F 3/12* (2006.01)
*G06K 15/00* (2006.01)
(52) U.S. Cl.
CPC .................................... *G06F 3/1273* (2013.01)
USPC ......................... 358/1.15; 358/1.13; 358/1.16
(58) Field of Classification Search
None
See application file for complete search history.

(56) References Cited

U.S. PATENT DOCUMENTS

| | | | |
|---|---|---|---|
| 2006/0050291 A1* | 3/2006 | Morikawa et al. | 358/1.13 |
| 2009/0086267 A1* | 4/2009 | Sato | 358/1.15 |
| 2010/0245902 A1* | 9/2010 | Sugiyama | 358/1.15 |
| 2010/0253971 A1* | 10/2010 | Ido et al. | 358/1.15 |
| 2014/0092437 A1* | 4/2014 | Hashimoto | 358/1.16 |

FOREIGN PATENT DOCUMENTS

| | | |
|---|---|---|
| JP | 2008-065422 A | 3/2008 |
| JP | 2010-224950 A | 10/2010 |

* cited by examiner

*Primary Examiner* — Satwant Singh
(74) *Attorney, Agent, or Firm* — Scully, Scott, Murphy & Presser, P.C.

(57) ABSTRACT

A printing apparatus including: a storage unit configured to store print data a printing unit configured to print the print data; and a control device configured to: erase the print data from the storage unit, when a cancel instruction to cancel printing of the print data stored in the storage unit is detected; generate a log before erasing the print data, the generated log including a first log related to erasing target data which is a portion of the print data to be erased; and store the generated log in a storage device.

8 Claims, 5 Drawing Sheets

FIG. 3

| PRINT DATA ID | ATTRIBUTE INFORMATION ||||| PRINT IMAGE | CANCEL PAGE |
| --- | --- | --- | --- | --- | --- | --- | --- |
| | PRINTING APPARATUS NAME | USER NAME | RECEPTION DATE | PRINTING SETTING | ... | | |
| ID-1 | MFP-A | USER α | y/m/d | SETTING 1 | ... | File1.jpg | |
| ID-2 | MFP-B | USER β | y/m/d | SETTING 2 | ... | File2.jpg | |
| ID-3 | MFP-A | USER α | y/m/d | SETTING 1 | ... | File3.jpg | 4 |

US 8,988,719 B2

PRINTING APPARATUS AND LOG RECORDING METHOD

CROSS-REFERENCE TO RELATED APPLICATIONS

This application claims priority from Japanese Patent Application No. 2012-220940 filed on Oct. 3, 2012, the entire contents of which are incorporated herein by reference.

TECHNICAL FIELD

Aspects of the invention relate to a printing apparatus that receives print data and executes printing. More specifically, aspects of the invention relate to a technology of generating a log related to print data.

BACKGROUND

A technology of receiving print data, executing printing and storing, as a log, information of the printing in an external device has been suggested. For example, related-art discloses a technology of, when printing print data, storing information, which is specified before the printing, in a server before the printing, and further, storing information, which is specified after the printing, in the server after the printing.

SUMMARY

However, the above technology has a following problem. That is, for the print data for which the printing has been completed, a relating log is recorded. However, for the print data for which the printing has not been completed due to cancellation, a relating log is not left.

In view of the above, there is provided a printing apparatus and a log recording method, in which a relating log is left even when print data is cancelled.

According to an aspect of the present invention, there is provided a printing apparatus including: a storage unit configured to store print data; a printing unit configured to print the print data; and a control device configured to: erase the print data from the storage unit, when a cancel instruction to cancel printing of the print data stored in the storage unit is detected; generate a log before erasing the print data, the generated log including a first log related to erasing target data which is a portion of the print data to be erased; and store the generated log in a storage device.

According to another aspect of the present invention, there is provided a log recording method of recording a log related to print data that is stored in a storage unit of a printing apparatus, the method including: erasing the print data from the storage unit, when a cancel instruction to cancel printing of the print data stored in the storage unit is detected; generating a log before erasing the print data, the generated log including a log related to erasing target data which is a portion of the print data to be erased; and storing the generated log in a storage device.

According to the above-described aspects, a printing apparatus and a log recording method, in which a relating log is left even when the print data is cancelled, are implemented.

BRIEF DESCRIPTION OF DRAWINGS

FIG. 3 illustrates an example of a log;

DETAILED DESCRIPTION

Hereinafter, an illustrative embodiment implementing a printing apparatus of the invention will be specifically described with reference to the accompanying drawings. In this illustrative embodiment, the invention is applied to a complex machine (MFP; Multi Function Peripheral) having an image reading function and an image forming function.

[Schematic Configuration of System]

Figure 1:
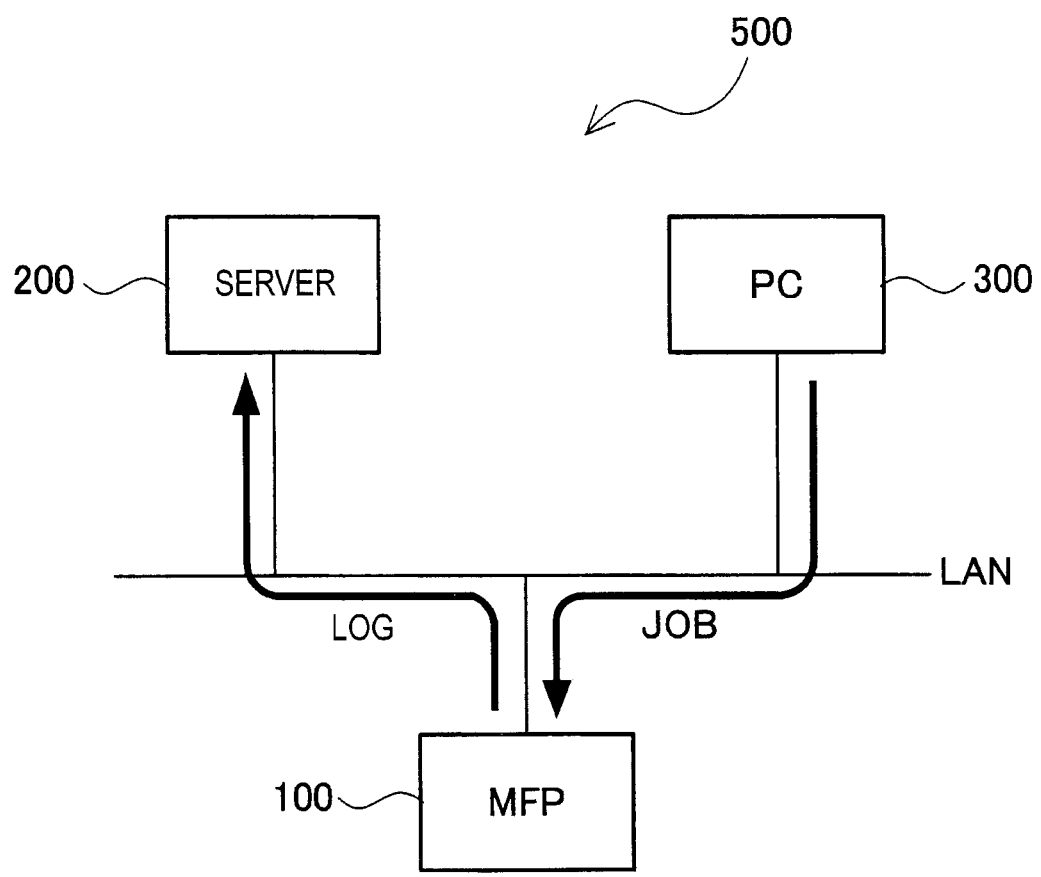
FIG. 1 is a schematic configuration view showing a printing system including an MFP according to an illustrative embodiment.

As shown in FIG. 1, an MFP 100, a server 200 and a PC 300 are connected to each other, thereby configuring a printing system 500. In this illustrative embodiment, the MFP 100 is an example of the printing apparatus.

A user operates the PC 300 to thus transmit print data to the MFP 100. The MFP 100 receives the print data from the PC 300 and executes printing based on the received print data.

Also, the MFP 100 generates a log related to the received print data and transmits the same to the server 200. The log transmitted by the MFP 100 is stored in a storage device included in the server 200. The log related to the print data includes attribute information about attributes of the print data, a print image of the print data, and the like.

[Electrical Configuration of MFP]

Subsequently, electrical configurations of the MFP 100 and the server 200 are described with reference to FIG. 2. The MFP 100 has a control device 30 having a CPU 31, a ROM 32, a RAM 33 and an NVRAM (non-volatile RAM) 34. The control device 30 is electrically connected to an image forming unit 1, an image reading unit 2, an operation panel 40, a network IF 37 and a USB IF 38.

The image forming unit 1 executes printing on a sheet and the like, based on the print data. An image forming method of the image forming unit 1 may be an electrophotographic method or inkjet method, for example. The image forming unit 1 is an example of the printing unit. The image reading unit 2 reads an image of a document. The image reading unit 2 has an image sensor that illuminates light towards the document and converts reflected light from the document into an electric signal to thereby output image data of the document, for example.

The operation panel 40 includes a touch panel, a ten-key keypad, an input button and the like. The operational panel 40 receives an operation that is made by a user and displays information for the user. The network IF 37 is connected to a network such as LAN. The MFP 100 can perform data communication with other information processing apparatus such as the server 200 and the PC 300 through the network IF 37. The MFP 100 transmits a log related to the print data to the server 200 through the network IF 37. Also, the MFP 100 can perform data communication with other information processing apparatus such as the PC 300 through the USB IF 38.

The control device 30 plays a key role on the control of the MFP 100. The CPU 31 of the control device 30 executes calculations for implementing a variety of functions such as an image reading function, an image forming function and the like. The CPU 31 carries out predetermined processing for the print data, which is received via the network IF 37 or USB IF 38, or image data, which is read by the image reading unit 2, in response to a program read out from the ROM 32, and enables the image forming unit 1 to execute printing. The CPU 31 is an example of the control device.

In the ROM 32, a variety of control programs for controlling the image forming unit 1 and the like, a variety of settings, initial values and the like are stored. The RAM 33 is used as a work area to which the control programs are loaded or a storage area in which various data is temporarily stored. For example, the print data that is received through the network IF 37 and the like is stored in the RAM 33 until the printing is completed. The RAM 33 is an example of the storage unit. The NVRAM 34 is a non-volatile storage member and is used as a storage area in which a variety of data and the like are saved.

Figure 2:
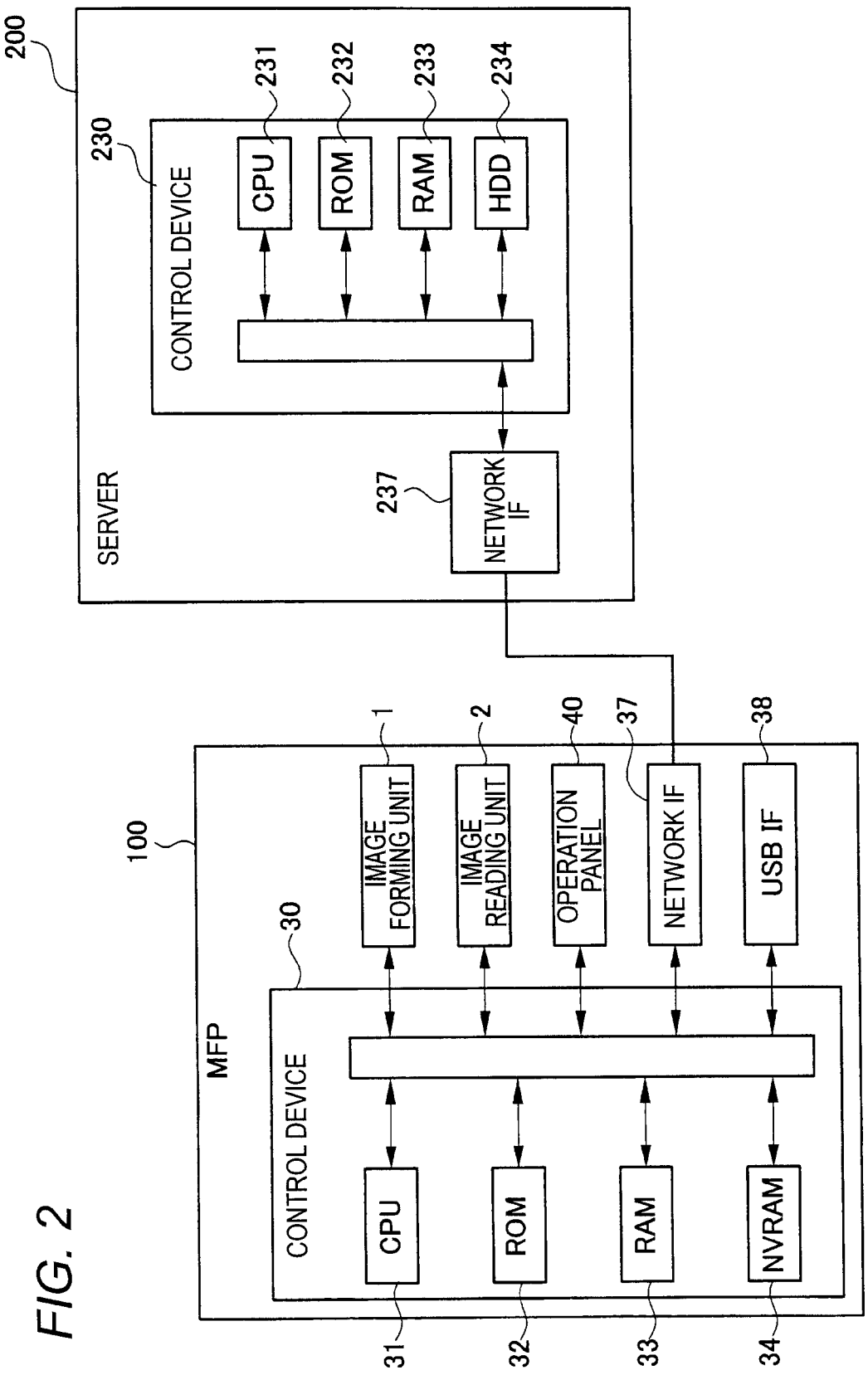
FIG. 2 is a block diagram showing electrical configurations of the MFP and a server.

Also, as shown in FIG. 2, the server 200 has a control device 230 having a CPU 231, a ROM 232, a RAM 233 and an HDD 234. The control device 230 is electrically connected to a network IF 237. The network IF 237 of the server 200 is connected to the network IF 37 of the MFP 100 through the network such as LAN. The server 200 stores the log, which is received from the MFP 100 through the network IF 237, in the HDD 234. The HDD 234 is an example of the storage device.

[Configuration of Log]

Next, a log that is generated by the MFP 100 is described. As shown in FIG. 3, the log is stored in a database 51 that is provided to the HDD 234 of the server 200. In the database 51, log records 53 that are generated for each print data are stored. The log record 53 includes a print data ID 55, attribute information 56, a print image 57 and a cancel page 58 of each print data.

The print data ID 55 is a code for identifying each print data. Also, the attribute information 56 is information about attributes of the print data, which includes a printing apparatus name, a user name, a reception data and the like. The print image 57 is image data that can visualize an image to be printed on a sheet and the like. The print image 57 may be image data having a general format such as bitmap, JPEG and the like or image data for which processing such as thumbnail has been performed. The cancel page 58 is information indicating a portion of the print data to which a printing of the print data has been cancelled. The cancel page 58 is an example of the identification information.

The MFP 100 generates, as a log, one log record 53 for each print data. Therefore, when the print data includes a plurality of pages, the print image 57 includes a plurality of image data. Even when a printing is cancelled while executing the printing of the print data, the MFP 100 generates the log record 53 including the print image 57 of all pages.

In the cancel page 58 of the log record 53 of the print data to which the printing is cancelled during the printing, a page number of a front page that has not been printed due to the cancellation is stored. For example, for print data that has been printed up to page three and the printing of page four and thereafter has been cancelled, the cancel page 58 is '4'. In the print image 57, pages before the cancel page 58 indicates data for which the printing has been completed and pages on and after the cancel page 58 indicates data that has not been printed.

[Log Generation Processing]

Figure 4:
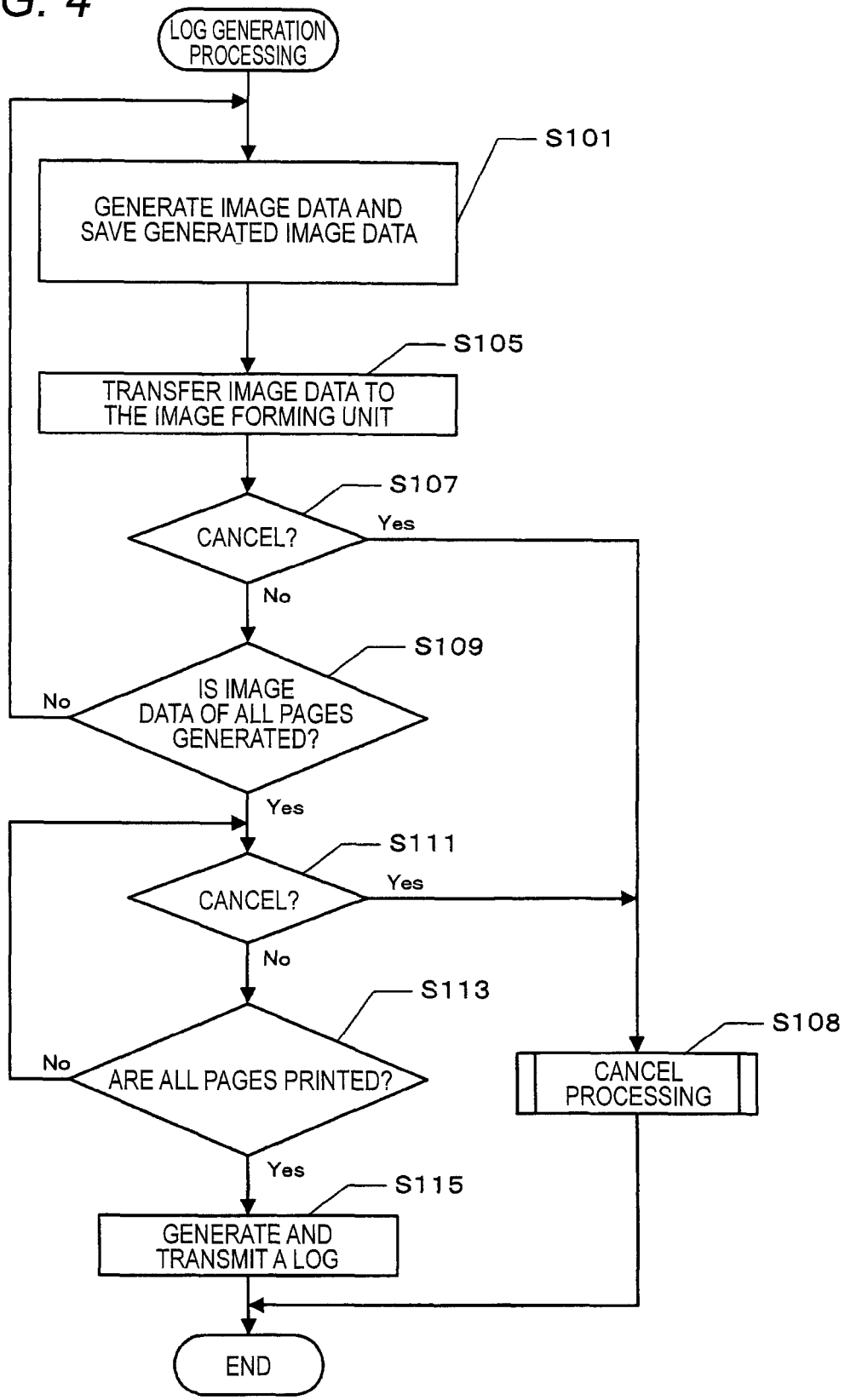
FIG. 4 is a flow chart showing a log generation processing.

Next, a log generation processing is described with reference to a flow chart of FIG. 4. The log generation processing is executed by the CPU 31 when the MFP 100 receives print data and an execution condition of printing the print data is satisfied.

When an execution condition of printing the print data is satisfied, the CPU 31 generates image data, which is data to which the image forming unit 1 performs printing, based on the print data and saves the generated image data in the RAM 33 (S101). For example, the CPU develops data described by a PDL and the like into a bitmap format and the like and sequentially saves the same. Also, the CPU generates the print image 57 for a log as regards the page for which the image data has been generated and saves the same in the RAM 33. The print image 57 may be the same data as the image data, data common to the image data or data of other format.

Also, the CPU 31 transfers the image data generated in S101 to the image forming unit 1 page-by-page (S105). The image forming unit 1 executes the printing page-by-page, based on the transferred image data, thereby preparing a printed material. The printing processing by the image forming unit 1 is concurrently executed, independently of the processing for preparing the image data by the CPU 31.

Then, the CPU 31 determines whether a cancel instruction for canceling the printing of the print data is received (S107). A user can cancel the printing of the print data by using the operation panel 40. Alternatively, the user can input a cancel instruction from the PC 300 and the like through the network such as LAN and the network IF 37. When the cancel instruction by the user is detected (S107: YES), the CPU 31 executes cancel processing (S108). The cancel processing will be specifically described later.

When it is determined in S107 that a cancel instruction is not received (S107: NO), the CPU 31 determines whether the processing of generating the image data is completed for all pages of the print data (S109). When the image data of all pages is not generated (S109: NO), the CPU returns to S101 and additionally generates image data of a next page (S101).

When the image data is generated for all pages of the print data without receiving a cancel instruction (S109: YES), the CPU further determines whether a cancel instruction of the printing is received (S111). When it is determined that a cancel instruction is not received (S111: NO), the CPU 31 determines whether the printing is completed for all pages of the print data (S113). When the printing is not completed (S113: NO), the CPU repeatedly determines whether a cancel instruction is received, until the printing is completed (S111).

When the printing is completed for all pages of the print data (S113: YES) without receiving a cancel instruction (S111: NO), it is determined that the print data is completed without being cancelled. Therefore, the image data of all pages is saved in the RAM 33.

The CPU 31 generates the log record 53 related to the print data and transmits the same to the server 200 (S115). In this case, since there is no cancelled page, the cancel page 58 is blank. The server 200 receives the transmitted log record 53 and stores the same in the database 51. Then, the CPU 31 ends the log generation processing.

On the other hand, when it is determined (S111: YES) that a cancel instruction is received before the printing is completed for all pages of the print data (S113: NO), the CPU executes cancel processing (S108), like the case where a result of the determination in S107 is YES.

[Cancel Processing]

Figure 5:
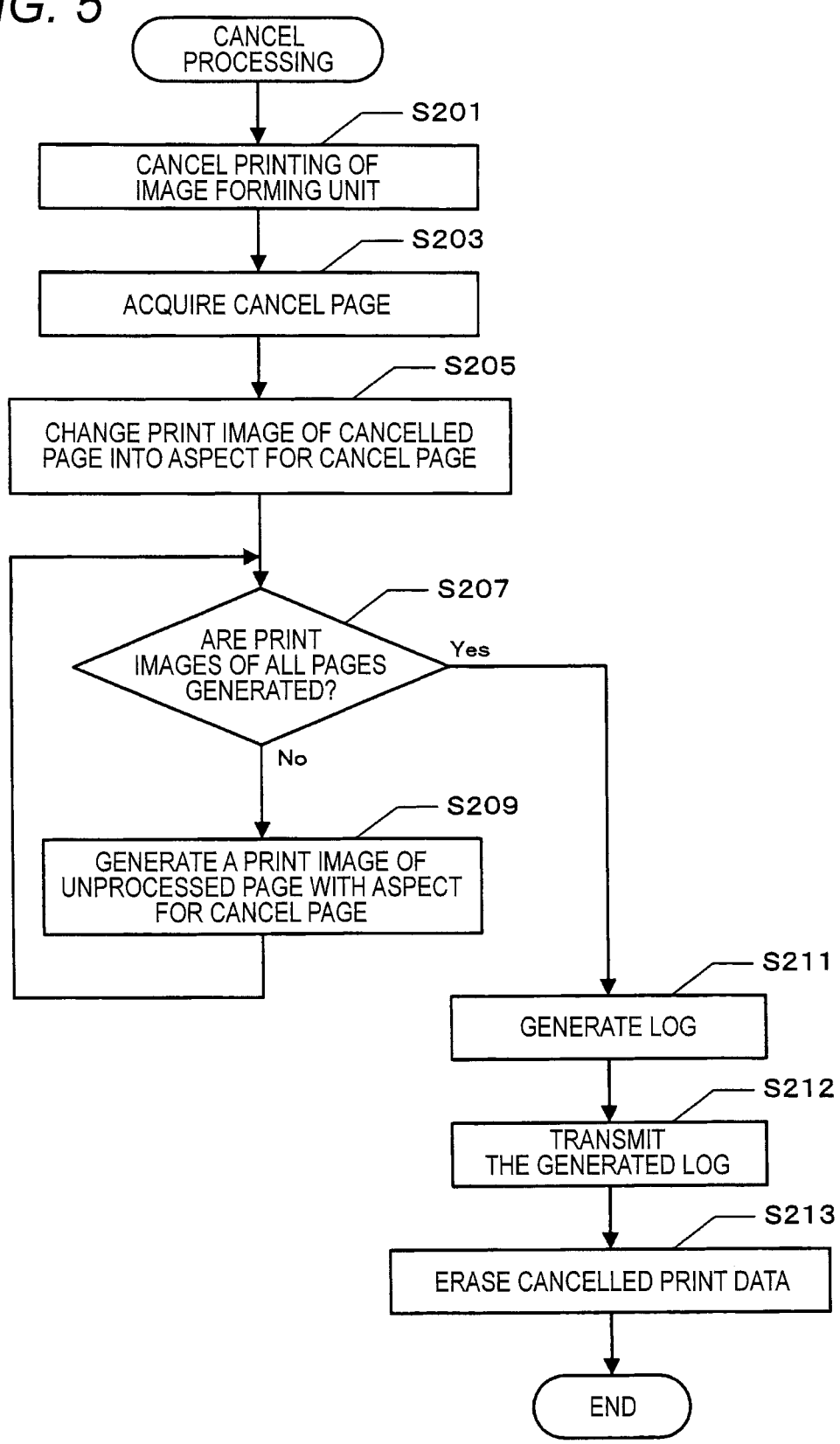
FIG. 5 is a flow chart showing a cancel processing.

The cancel processing that is executed in S108 is described with reference to a flow chart of FIG. 5.

When a cancel instruction is received, the CPU 31 first cancels the printing being performed by the image forming unit 1 (S201). Thereby, the MFP 100 completes the printing of the page being printed at that time and does not start the printing of a next page. Then, the CPU acquires the cancel page 58, which is the information of a page number of the front of pages that have not been printed due to the cancellation (S203).

Then, to the cancelled page, the CPU changes the print image 57 stored in the RAM 33 into a print image 57 for a cancel page (S205). The print image 57 for the cancel page is different from the print image 57 of the printed page in terms of the generation aspect. When the generation aspect of the print image 57 is different, a manager of the log can easily distinguish a printed page and an unprinted page.

For example, the print image 57 for a cancel page is generated with an aspect of satisfying at least one of an aspect having the smaller number of colors and an aspect having a lower resolution, compared to the print image 57 of the printed image. Alternatively, these generation aspects may be vice versa. Also, for example, a letter or mark, which indicates that printing has not been performed, may be directly embedded in the print image 57 of the cancelled page.

When all the aspects of the print image 57 of the cancelled pages of the generated print image 57 are changed, the CPU 31 then determines whether the generation of the print image 57 is completed for all pages of the print data (S207). When the print data includes a page for which the generation of the print image 57 has not been completed (S207: NO), the CPU generates the print image 57 of an unprocessed page with the generation aspect for a cancel page (S209).

When the generation of the print image 57 is completed for all pages of the print data (S207: YES), the CPU generates the log record 53 of the print data (S211). The CPU 31 generates the log record 53 on condition that the cancel instruction is received.

In the print image 57 of the log record 53 generated in S211, the pages before of the cancel page 58 is data having an aspect of a printed page and the page on and after the cancel page 58 is data having an aspect of a cancelled page. The page number acquired in S203 is data of the cancel page 58 of the log record 53.

That is, regarding the log of the print data for which the printing is cancelled during the printing, the print image 57 equivalent to the printed material is stored for the printed page. On the other hand, for an unprinted page, the print image 57 having an aspect different from the printed page is stored so that it can be distinguished from the printed page. Thereby, the manager of the log can easily distinguish the printed page and the unprinted page by the print image 57.

The MFP 100 transmits the log record 53 generated in S211 to the server 200 (S212). The server 200 receives the transmitted log record 53 and stores the same in the database 51. Thereby, even when the printing of the print data is cancelled, the print image 57 of all pages including the pages that have not been printed due to the cancellation is stored in the server 200.

When the transmission of the log record 53 is completed, the CPU 31 erases the cancelled print data (S213). By the processing of S213, all the image data of the print data stored in the RAM 33 is erased. When the print image 57 is separately generated from the image data, the print image 57 is also erased. With this, the CPU 31 ends the cancel processing and returns to S108 of FIG. 8 to thereby end the log generation processing.

As specifically described above, the MFP 100 of this embodiment erases the print data from the RAM 33 when the cancel instruction to cancel the printing of the print data stored in the RAM 33 is detected. Also, before the erasing, the MFP generates the log related to the data that is the erasing target of the print data and stores the same in the storage device that is a device of the storing destination of the log. By doing so, the MFP can leave the log even for the print data that has been erased by the cancel instruction.

In the meantime, the above illustrative embodiment is exemplary and does not limit the invention. Therefore, the invention can be variously improved and modified without departing from the scope of the invention. For example, the invention is not limited to the MFP and can be also applied to any apparatus having an image forming function such as a printer, a copier, a scanner, a FAX and the like.

For example, the configuration of the log is not limited to the above example. The log may include at least the information of a page of the print data, which has been cancelled and thus has not been printed. For example, the log may include only the attribute information 56 or the print image 57. However, the print image 57 is preferably included because the manager of the log can easily perceive an image. Also, the log need not include the information of the page that has been printed without being cancelled.

Also, the log need not include the cancel page 58. When the cancel page 58 is not included in the log, a recording sequence of the cancel page 58 is not necessary. In the meantime, when the cancel page 58 is included, it is possible to easily distinguish whether each page of the print image 57 is a printed image or an unprinted image. When the cancel page 58 is not included in the log, a letter or mark indicating that a printing has not been performed may be directly embedded in the print image 57 of the cancelled page.

Also, the print image 57 of the page that has not been printed due to the cancellation has been configured with the aspect for a cancel page. However, the invention is not limited thereto. For example, the print image 57 having the same aspect as the printed page may be also stored for the non-printed page. However, when the number of colors is reduced or the resolution is made to be lower, a data amount is reduced, so that load of the storing processing is reduced, which is preferable Also, for example, in the above illustrative embodiment, as the log, one log record 53 is generated for the entire print data. However, one log record 53 may be generated for each page. The log records 53 of respective pages are related to each other by the print data IDs 55. In this case, the cancel page 58 may include information for identifying whether the print image 57 of the log record 53 is a printed page or not. The manager of the log can easily perceive whether the print image 57 is a printed page or not for each of the log records 53 by the information of the cancel page 58.

Also, for example, in the above illustrative embodiment, the entire log record 53 including the cancel page 58 is one log. However, the invention is not limited thereto. The cancel page 58 may be information that is managed separately from the log in relation with the log, not a part of the log. For example, the cancel page 58 may be a database that is managed by the print data ID 55, separately from the log.

Also, for example, the print image 57 for the log is generated upon the generation of the image data. However, the print image and the image data may be generated at different timings. For example, only the image data may be generated before executing printing and the print image 57 may be generated when generating of the log.

Also, for example, a portion or all of the log related to the print data may be transmitted to the server 200 before starting the printing of the print data. Here, when the printing is cancelled, a command of changing the aspect of the log related to an unprinted page may be transmitted to the server 200.

Also, for example, in the above illustrative embodiment, the log is stored in the HDD 234 of the server 200. However, the log may be stored in an embedded storage device such as NVRAM 34 of the MFP 100.

Also, the processing described in the illustrative embodiment may be executed by hardware such as a single CPU, a plurality of CPUs, an ASIC and the like or a combination thereof. Also, the processing described in the illustrative embodiment may be implemented by a variety of aspects such as a recording medium recording a program for executing the processing and a method.

The present invention provides illustrative, non-limiting examples as follows:

(1) In a first aspect, there is provided a printing apparatus including: a storage unit configured to store print data; a printing unit configured to print the print data; and a control device configured to: erase the print data from the storage unit, when a cancel instruction to cancel printing of the print data stored in the storage unit is detected; generate a log before erasing the print data, the generated log including a first log related to erasing target data which is a portion of the print data to be erased; and store the generated log in a storage device.

According to the first aspect, when the printing of the print data is cancelled, the printing apparatus disclosed in the specification generates a log including a first log related to erasing target data, which is a portion of the print data to be erased, before erasing the print data, and stores the generated log in the storage device. In the meantime, the print data may be data of one page or data of a plurality of pages. Also, the first log may be a print image or attribute information (for example, a user name, a print data identifier, a reception data and a page number). Also, the log may be generated at any time insomuch as it is generated before erasing the print data. For example, the log may be generated just after the cancel instruction is received or just after the print data is stored. Also, it does not matter whether the log related to the printed data is left or not. The storage device is not limited to the external apparatus such as a server and may be an embedded storage device.

Further, before erasing the print data, the log including the first log related to the erasing target data, which is a portion of the print data to be erased, is stored. Therefore, the log can be left even for the print data that has been erased by the cancel instruction.

(2) In a second aspect, there is provided the printing apparatus according to the first aspect, wherein the generated log further includes a second log related to printed data which is a portion of the print data having been printed, and wherein, when storing the generated log in the storage device, the control device is further configured to: store identification information, which includes information identifying the erasing target data or the printed data, in the storage device in relation with the generated log.

According to the second aspect, both the printed data and the erasing target data are stored, and the identification information capable of identifying the printed data and the erasing target data is also stored. Therefore, a manager of the log can easily perceive the erasing target of the entire print data.

(3) In a third aspect, there is provided the printing apparatus according to the first aspect, wherein the generated log includes a print image of the print data.

According to the third aspect, the print image is left, so that the manager of the log can easily perceive a content of the print data.

(4) In a fourth aspect, there is provided the printing apparatus according to the first aspect, wherein, when generating the generated log, the control unit is further configured to: generate a print image of the print data before erasing the print data.

According to the fourth aspect, the print image is left, so that the manager of the log can easily perceive a content of the print data.

(5) In a fifth aspect, there is provided the printing apparatus according to the third aspect, wherein the generated log further includes a second log related to printed data which is a portion of the print data having been printed, and wherein a generation aspect of the print image of the print data is made to be different depending on whether the print data is the erasing target data or the printed data.

According to the fifth aspect, the generation aspects of the print image are made to be different, so that the manager of the log can easily perceive the erased data and the printed data.

(6) In a sixth aspect, there is provided the printing apparatus according to the fifth aspect, wherein, when generating the generated log including the print image, at least one of a number of colors and a resolution is made to be different between the print image of the erasing target data and the print image of the printed data.

According to the sixth aspect, the manager of the log can easily perceive the erased data and the printed data.

(7) In a seventh aspect, there is provided the printing apparatus according to the third aspect, wherein the generated log further includes a second log related to printed data which is a portion of the print data having been printed, and wherein, when generating the generated log including the print image, the control unit is further configured to: embed specific information, which specifies the erasing target data or the printed data, in the print image.

According to the seventh aspect, the specific information is embedded in the print image, so that the manager of the log can easily perceive the erased data and the printed data. In the meantime, the specific information may be letter information such as 'cancel' or image information such as mark that means cancel.

(8) In an eighth aspect, there is provided the printing apparatus according to the first aspect, wherein the generated log is generated on condition that the cancel instruction is detected.

According to the eighth aspect, the log is generated after the cancel instruction is received and a cancel target is decided. Therefore, compared to a configuration where a log is generated without deciding a cancel target, the waste is reduced and it is efficient.

(9) In a ninth aspect, there is provided the printing apparatus according to the first aspect, wherein the storage device, in which the generated log is stored, is an external device.

According to the ninth aspect, the manager of the log can easily handle the log.

(10) In a tenth aspect, there is provided a log recording method of recording a log related to print data that is stored in a storage unit of a printing apparatus, the method including: erasing the print data from the storage unit, when a cancel instruction to cancel printing of the print data stored in the storage unit is detected; generating a log before erasing the print data, the generated log including a log related to erasing target data which is a portion of the print data to be erased; and storing the generated log in a storage device.

What is claimed is:

1. A printing apparatus comprising:
   a storage unit configured to store print data;
   a printing unit configured to print an image related to the print data; and
   a control device configured to:
     detect a cancel instruction to cancel printing of the image related to the print data stored in the storage unit;
     erase the print data from the storage unit, when the cancel instruction is detected;

generate a log, when the cancel instruction is detected, the log being generated before erasing the print data, the generated log including a first log related to erasing target data which is a portion of the print data to be erased, the generated log including a print image of the print data and the first log is a log related to the print data for which an image has not been printed by the printing unit; and store the generated log in a storage device.

2. The printing apparatus according to claim 1, wherein the generated log further includes a second log related to printed data which is a portion of the print data having been printed, and wherein, when storing the generated log in the storage device, the control device is further configured to:

store identification information, which includes information identifying the erasing target data or the printed data, in the storage device in relation with the generated log.

3. The printing apparatus according to claim 1, wherein, when generating the generated log, the control unit is further configured to:

generate the print image of the print data before erasing the print data.

4. The printing apparatus according to claim 1, wherein the generated log further includes a second log related to printed data which is a portion of the print data having been printed, and wherein a generation aspect of the print image of the print data is made to be different depending on whether the print data is the erasing target data or the printed data.

5. The printing apparatus according to claim 4, wherein, when generating the generated log including the print image, at least one of a number of colors and a resolution is made to be different between the print image of the erasing target data and the print image of the printed data.

6. The printing apparatus according to claim 1, wherein the generated log further includes a second log related to printed data which is a portion of the print data having been printed, and wherein, when generating the generated log including the print image, the control unit is further configured to:

embed specific information, which specifies the erasing target data or the printed data, in the print image.

7. The printing apparatus according to claim 1, wherein the storage device, in which the generated log is stored, is an external device.

8. A log recording method of recording a log related to print data that is stored in a storage unit of a printing apparatus, the method comprising:

detecting a cancel instruction to cancel printing of an image related to the print data stored in the storage unit;

erasing the print data from the storage unit, when the cancel instruction is detected;

generating a log, when the cancel instruction is detected, the log being generated before erasing the print data, the generated log including a log related to erasing target data which is a portion of the print data to be erased, the generated log including a print image of the print data and the first log is a log related to the print data for which an image has not been printed by the printing unit; and storing the generated log in a storage device.

* * * * *